United States Patent
Stottlemyer

(10) Patent No.: US 9,544,412 B2
(45) Date of Patent: Jan. 10, 2017

(54) VOICE PROFILE-BASED IN-VEHICLE INFOTAINMENT IDENTITY IDENTIFICATION

(71) Applicant: Ford Global Technologies, LLC, Dearborn, MI (US)

(72) Inventor: Brett Stottlemyer, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/642,271

(22) Filed: Mar. 9, 2015

(65) Prior Publication Data
US 2016/0269524 A1    Sep. 15, 2016

(51) Int. Cl.
*H04B 1/38* (2015.01)
*H04M 1/00* (2006.01)
*H04M 1/60* (2006.01)
*H04B 1/3822* (2015.01)

(52) U.S. Cl.
CPC ......... *H04M 1/6091* (2013.01); *H04B 1/3822* (2013.01)

(58) Field of Classification Search
CPC ........................... H04B 1/3822; H04M 1/6091
USPC ........................................................ 455/563
See application file for complete search history.

(56) References Cited

U.S. PATENT DOCUMENTS

| | | | |
|---|---|---|---|
| 7,107,010 B2 * | 9/2006 | Heinonen | H04M 1/6066 370/312 |
| 7,826,945 B2 * | 11/2010 | Zhang | G06F 3/16 701/36 |
| 8,600,367 B2 | 12/2013 | Rau et al. | |
| 8,744,995 B1 | 6/2014 | Hewinson | |
| 2013/0185072 A1 | 7/2013 | Huang et al. | |
| 2015/0277114 A1 * | 10/2015 | Westra | B60K 35/00 345/8 |

OTHER PUBLICATIONS

"Owners Bluetooth Your BMW FAQ BMW North America," printed from website Dec. 13, 2014, www.bmwusa.com/Standard/Content/Owner/BluetoothTechnology/FAQ.aspx. (2 pages).
"Uconnect | Phone | Bluetooth Pairing, Hands Free Calling and Texting," printed from website on Dec. 13, 2014, www.driveuconnect.com/features/phone/. (3 pages).

* cited by examiner

*Primary Examiner* — Qutbuddin Ghulamali
(74) *Attorney, Agent, or Firm* — Jennifer M. Stec; Brooks Kushman P.C.

(57) ABSTRACT

A computing platform of a vehicle may communicate with a plurality of mobile devices. The computing platform may identify a voice profile as matching voice input received from a user, the voice profile associated with one of a plurality of mobile devices within the vehicle; perform speech recognition on the voice input using the voice profile to determine a voice command; and process the voice command in the context of the mobile device associated with the voice profile. The voice profiles may be retrieved from a remote telematics server based on unique device identifiers retrieved from the mobile devices connected to the computing platform or retrieved from storage of the mobile devices connected to the computing platform.

17 Claims, 5 Drawing Sheets

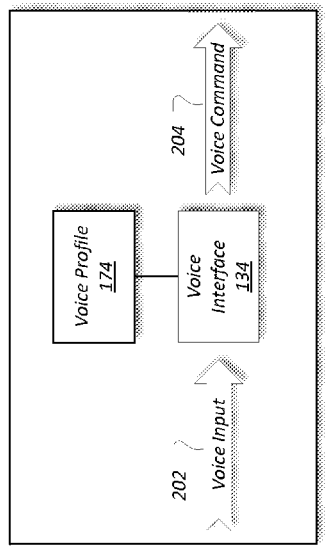
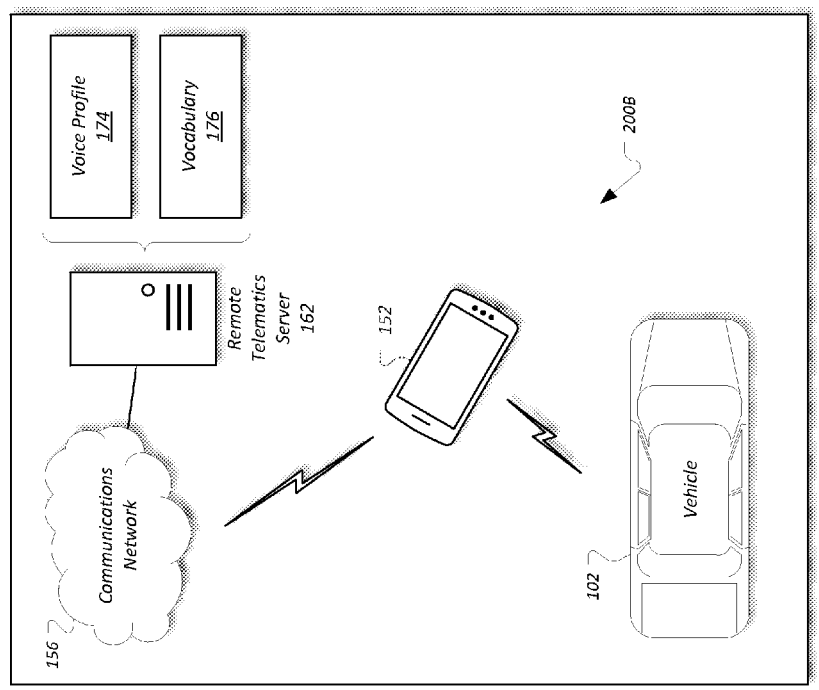
FIG. 2C
FIG. 2B

VOICE PROFILE-BASED IN-VEHICLE INFOTAINMENT IDENTITY IDENTIFICATION

TECHNICAL FIELD

Aspects of the disclosure relate to use of user voice profiles to identify speakers of voice commands within a vehicle for infotainment command processing and other features.

BACKGROUND

Vehicle computing platforms frequently come equipped with voice recognition interfaces. Such interfaces allow a driver to perform hands-free interactions with the vehicle, freeing the driver to focus maximum attention on the road. If the system is unable to recognize the driver's commands, the driver may manually correct the input to the system through a button or touchscreen interface, potentially causing the driver to be distracted and lose focus on the road.

Voice recognition is typically a probabilistic effort whereby input speech is compared against a grammar for matches. High quality matches may result in the system identifying the requested services, while low quality matches may cause voice commands to be rejected or misinterpreted. In general, vehicles may use recognition systems at least initially tuned to provide good results on average, resulting in positive experiences for the maximum number of new users. If a user has an accent or unusual mannerisms, however, match quality may be reduced. Moreover, as voice command input to a vehicle may be relatively infrequent, it may take a significant time for a vehicle to learn a user's speech patterns.

U.S. Patent Application 2010/0185445 generally relates to a machine, system and method for user-guided teaching and modifications of voice commands and actions to be executed by a conversational learning system. The machine includes a system bus for communicating data and control signals received from the conversational learning system to a computer system, a vehicle data and control bus for connecting devices and sensors in the machine, a bridge module for connecting the vehicle data and control bus to the system bus, machine subsystems coupled to the vehicle data and control bus having a respective user interface for receiving a voice command or input signal from a user, a memory coupled to the system bus for storing action command sequences learned for a new voice command and a processing unit coupled to the system bus for automatically executing the action command sequences learned when the new voice command is spoken.

SUMMARY

In a first illustrative embodiment, a vehicle includes a computing platform programmed to identify a voice profile as matching voice input received from a user, the voice profile associated with one of a plurality of mobile devices within the vehicle; perform speech recognition on the voice input using the voice profile to determine a voice command; and process the voice command in context of the mobile device associated with the voice profile.

In a second illustrative embodiment, a computer-implemented method includes using a voice profile identified by a computing platform of a vehicle as associated with one of a plurality of mobile devices within the vehicle for performing speech recognition on voice input received from a user to determine a voice command; and processing the voice command in context of the mobile device associated with the voice profile.

In a third illustrative embodiment, a non-transitory computer-readable medium, embodies instructions that, when executed by a processor, are configured to cause the processor to match vocal biometrics of voice input to voice characteristics of each of a plurality of voice profiles associated with mobile devices connected to the vehicle; identify which voice profile most closely matches the vocal biometrics of the voice input; perform speech recognition on the voice input using the identified voice profile to determine a voice command; and process the voice command in context of the mobile device associated with the identified voice profile.

BRIEF DESCRIPTION OF THE DRAWINGS

FIG. 2B illustrates an example of a voice profile stored to the remote telematics server;

FIG. 2C illustrates an example of the voice interface recognizing a voice command within voice input utilizing the voice profile;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some vehicles allow for the pairing and connection of multiple phones to the vehicle. When multiple phones are connected and a command is spoken relating to phone functionality, the vehicle may attempt to process the command in the context of one of the phones. For example, the vehicle may utilize the most recently paired phone, or a highest priority phone identified according to a pre-established priority order of the phones. However, as commands may be interpreted differently depending on which phone context is used, if an incorrect phone is utilized, such approaches may have undesirable results. For example, a speaker within the vehicle may say "call mom," but if the command is processed in the context of another user's device, the vehicle may call the wrong "mom." An inelegant solution to this issue may be for the vehicle to request the vehicle occupants to provide clarification when multiple devices are paired.

In an improved voice command system, a vehicle may be connected to multiple connected phones, where each phone is associated with a voice profile. When a spoken command is received by the vehicle, the vehicle may use the voice profiles to identify which connected phone is associated with the speaker. When the speaker's phone is identified, the vehicle may use the phone of the speaker to process the command in the context of the appropriate phone. Continuing with the example of calling a contact named "mom," having identified the speaker and the corresponding mobile device, the vehicle may process the command "call mom" in the context of the correct phone and call the correct "mom." Further aspects of the voice command system are discussed herein.

Figure 1:
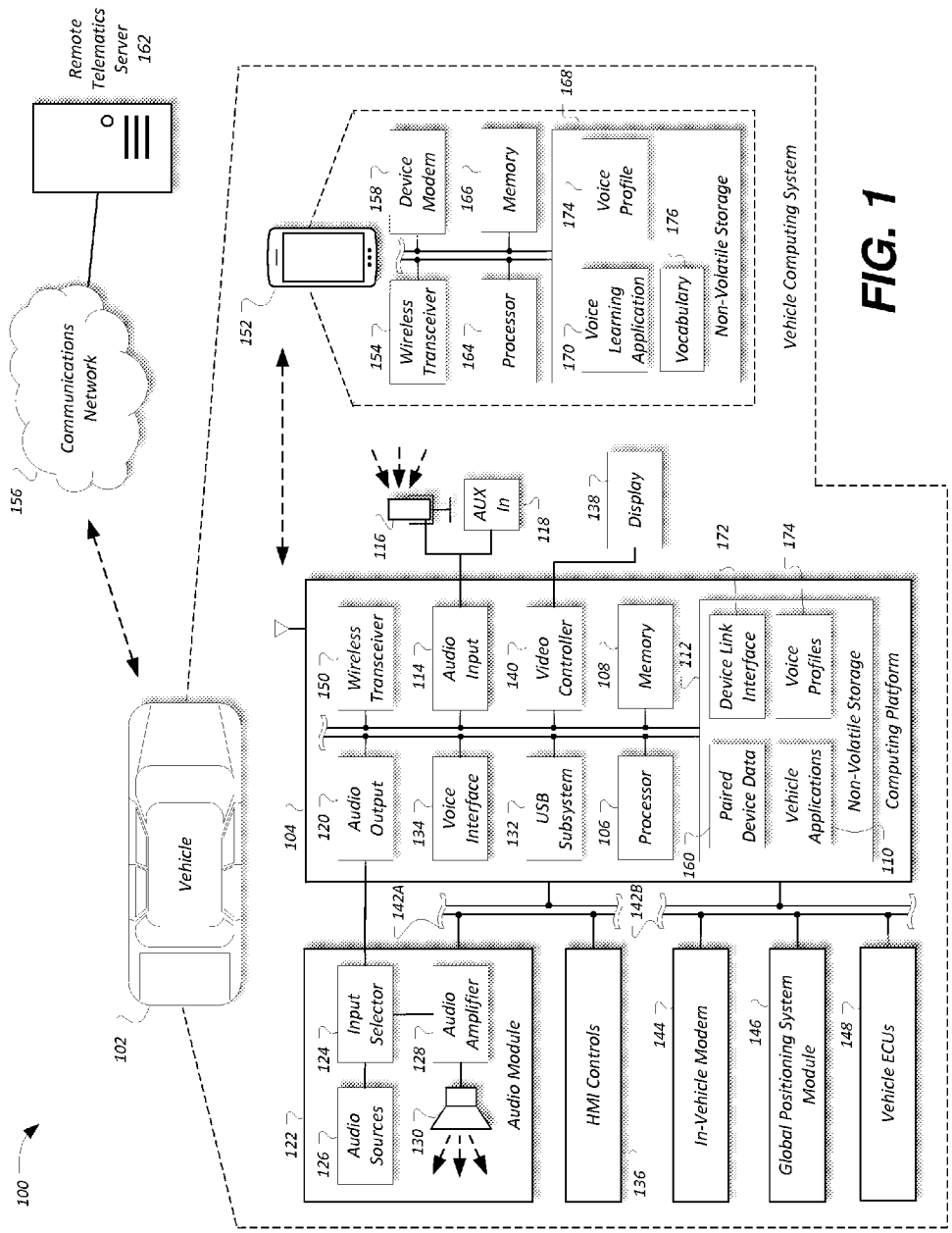
FIG. 1 illustrates an example diagram of a system configured to provide telematics services to a vehicle.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. The voice interface 134 may utilize probabilistic voice recognition techniques using the grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server 162 or other network services via the device modem 158. The computing platform 104 may also include a device link interface 172 to facilitate the integration of functionality of the mobile applications into the grammar of commands available via the voice interface 134. The device link interfaced 172 may also provide the mobile applications with access to vehicle information available to the computing platform 104 via the in-vehicle networks 142. An example of a device link interface 172 may be the SYNC APPLINK component of the SYNC system provided by The Ford Motor Company of Dearborn, Mich. A voice learning application 170 may be an example of a mobile application installed to the mobile device 152 and configured to utilize the device link interface 172 to interact with the computing platform 104.

Improving voice recognition rates for a specific user may require use of a voice profile 174 indicative of the user's particular accent and other vocal characteristics. The voice learning application 170 may be configured to prompt the user to speak vocabulary 176 (e.g., words or phrases), and use the received voice input to tune data for that user to create a voice profile 174 accounting for the user's accent and speech patterns. The voice profile 174 may further capture include additional information regarding the speaker that may be used to identify the speaker, such as pitch, harmonics, average frequency of first formants, or other measureable vocal biometrics regarding the user's voice. The voice profile 174 may also include or otherwise be associated with one or more identifiers of the user (e.g., a unique device identifier of the mobile device 152, etc.) In many cases, the voice learning application 170 may be configured to be executable off-board from the vehicle 102, i.e., when the user is not currently within or driving the vehicle 102, and collect and maintain the voice profile 174 for use when the user is within the vehicle 102. Some implementations may allow for the user to train the voice profile 174 using the vehicle 102 itself, using the mobile device 152 within the vehicle 102, or using another computing device (e.g., a desktop computer) capable of transferring the voice profile 174 to the mobile device 152 or other vehicle-accessible storage, as some other possibilities.

When the mobile device 152 is connected to the vehicle 102, the voice profile 174 information may be shared with the voice interface 134 of the computing platform 104 via the device link interface 172. As one possibility, the voice profile 174 may be transferred from the mobile device 152 to the computing platform 104. As another possibility, an identifier of the user may be transferred from the mobile device 152 to the computing platform 104, and the voice profile 174 may be retrieved by the vehicle 102 from the remote telematics server 162. Sharing of the voice profile 174 may allow the voice interface 134 of the vehicle 102 to improve its voice recognition results by accounting for particularities in the speech of the user whose device is paired to the computing platform 104. If no voice profile 174 is available for a user, the voice interface 134 may default to use of a standard, generic user profile.

Figure 2A:
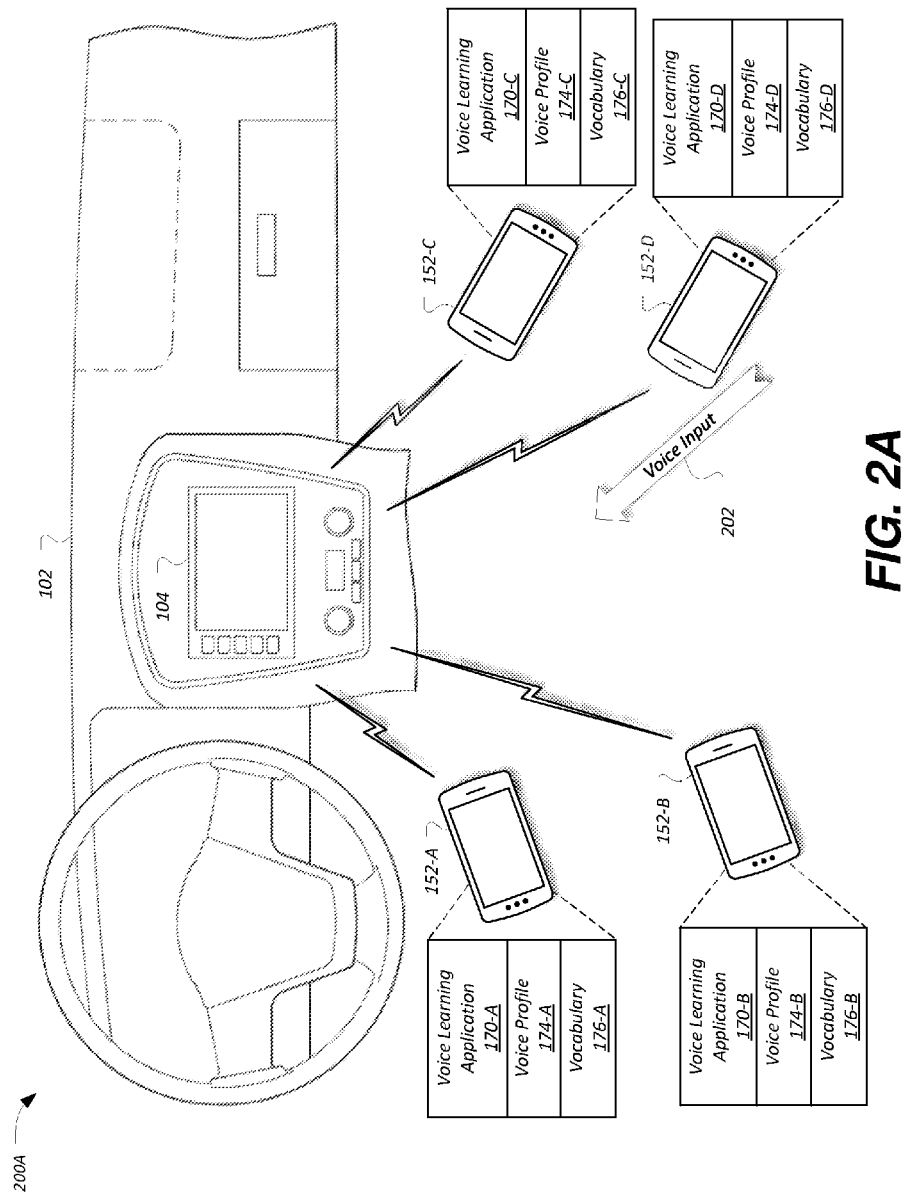
FIG. 2A illustrates an example portion of a vehicle with multiple paired mobile devices.

FIG. 2A illustrates an example 200A portion of a vehicle 102 with multiple paired mobile devices 152. As shown, the vehicle 102 includes a mobile device 152-A sharing a voice profile 174-A with the voice interface 134 via the voice learning application 170-A, a mobile device 152-B sharing a voice profile 174-B with the voice interface 134 via the voice learning application 170-B, a mobile device 152-C sharing a voice profile 174-C with the voice interface 134 via the voice learning application 170-C, and a mobile device 152-D sharing a voice profile 174-D with the voice interface 134 via the voice learning application 170-D. In the illustrated example, multiple mobile devices 152-A through 152-D (collectively 152) are concurrently paired to the computing platform 104. This may occur, as one example, when multiple family members who share a vehicle 102 enter for a trip while carrying their respective mobile devices 152.

Each mobile device 152-A through 152-D is also shown as maintaining respective vocabulary 176-A through 176-D, which may be used by the respective voice learning application 170-A through 170-D to train the respective voice profiles 174-A through 174-D.

As another example of voice profile 174 storage, FIG. 2B illustrates an example 200B of a voice profile 174 stored to the remote telematics server 162. In such an example, an identifier of the user may be transferred from the mobile device 152 to the computing platform 104 (e.g., MDN, IP addresses, MAC address, user account name, etc.), and the voice profile 174 may be retrieved by the vehicle 102 from the remote telematics server 162 using the identifier. It should be noted, however, that in many examples storage of the voice profiles 174 may be done by the mobile devices 152 without storage to the remote telematics server 162.

Regardless of from where the voice profiles 174 are retrieved, the vehicle 102 may utilize the voice profiles 174 associated with the connected mobile devices 152 to identify the speaker of a voice input 202. For example, the voice interface 134 may identify voice characteristics of the voice input 202, such as pitch, harmonics, average frequency of first formants, or other measureable vocal biometrics. Using the information of the voice profiles 174, the voice interface 134 may match those characteristics to the voice characteristics of each of the voice profiles 174 associated with mobile devices 152 connected to the computing platform 104. Based on the matching, the voice interface 134 may identify which voice profile 174 most closely matches the voice characteristics of the voice input 202. Having identified the voice profile 174, as shown in FIG. 2C, the voice interface 134 may accordingly identify the mobile device 152 to use as a context for executing a voice command 204 recognized within the voice input 202. Moreover, having recognized the voice command 204, the voice interface 134 may process the voice command 204 in the context of the mobile device 152 associated with the identified voice profile 174.

As a more specific example, the user of the mobile device 152-D may speak voice input 202 including the voice command 204 "call mom." The voice interface 134 may accordingly receive the voice input 202 and attempt to identify the speaker using the voice profiles 174-A through 174-D. These voice profiles 174-A through 174-D may have previously been indicated as representing users currently within the vehicle 102 (e.g., when the mobile devices 152 were connected to the computing platform 104). The voice interface 134 may compare the voice characteristics to those specified by the voice profiles 174, and may determine that the speaker's voice best matches the voice profile 174-D. Accordingly, the vehicle 102 may perform speech recognition on the voice input 202 with a tuning specified by the voice profile 174-D, recognize the voice command 204 "call mom," and process the voice command 204 "call mom" in the context of the address book of the device associated with the voice profile 174-D, i.e., mobile device 152-D. Accordingly, the system 100 may call the correct "mom" contact. Thus, the voice profiles 174 may be used to both improve voice recognition quality, and also to disambiguate multiple candidate speakers to identify the speaker of the voice input 202.

Figure 3:
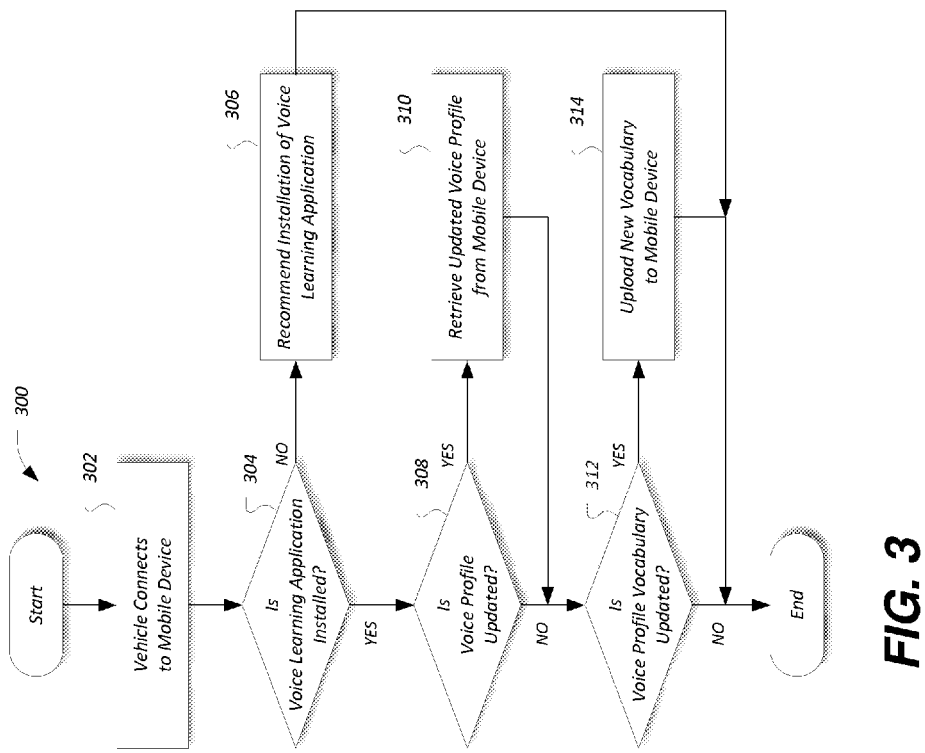
FIG. 3 illustrates an example process for connecting and synchronizing the vehicle with the mobile device.

FIG. 3 illustrates an example process 300 for connecting and synchronizing the vehicle 102 with the mobile device 152. The process 300 may be performed, in an example, by the vehicle 102 in communication with one or more mobile devices 152. The communication may be performed, for instance, via the wireless transceivers 150 and 154 or via a wired connection between the computing platform 104 and mobile device 152.

At operation 302, the vehicle 102 connects to the mobile device 152. This may occur, for example, responsive to the user entering the vehicle 102 with the mobile device 152. The computing platform 104 may utilize the paired device data 160 to identify whether the mobile device 152 is associated with a unique device identifiers previously paired with the computing platform 104 of the vehicle 102, such that the computing platform 104 should automatically reconnected to the mobile devices 152 referenced in the paired device data 160 without user intervention.

At operation 304, the vehicle 102 determines whether the voice learning application 170 is installed to the mobile device 152. In an example, upon pairing, the mobile device 152 may provide information to the vehicle 102 indicating its currently installed mobile applications that may be available for use by the vehicle 102. In another example, the vehicle 102 may query the mobile device 152 to determine whether the voice learning application 170 is installed. If the voice learning application 170 is installed, control passes to operation 308. Otherwise control passes to operation 306.

At operation 306, the vehicle 102 recommends the voice learning application 170 to the mobile device 152 for installation. The recommendation may further include information indicating to the user of the mobile device 152 that the voice learning application 170 may aid in allowing the vehicle 102 to better understand voice input from the user. In some examples, the vehicle 102 may wait until the user encounters at least a threshold amount of recognition errors by the voice interface 134 using the standard user profile before recommending the voice learning application 170, in case the user's speech patterns acceptably match the standard profile. After operation 306, the process 300 ends.

At operation 308, the vehicle 102 determines whether the voice learning application 170 has an updated voice profile 174 for the user of the connected mobile device 152. In an example, the computing platform 104 may query the mobile device 152 for a unique identifier and last modified date of voice profile 174 information maintained by the mobile device 152. When the mobile device 152 includes a new or an updated voice profile 174 not cached to the vehicle 102 (e.g., to the storage 112), control passes to operation 310. Otherwise control passes to operation 312.

At operation 310, the vehicle 102 retrieves the indicated voice profiles 174 from the mobile device 152. In an example, the computing platform 104 may request the voice profiles 174 be transferred to the computing platform 104 (e.g., to be maintained in the storage 112). It should be noted that in other examples, the computing platform 104 may retrieve any available voice profiles 174, regardless of date or user. In still other examples, the vehicle 102 may retrieve the voice profiles 174 from the remote telematics server 162, e.g., based on a unique device identifier retrieved from the connected mobile device 152.

At operation 312, the vehicle 102 determines whether updated vehicle profile vocabulary 176 information is available on the vehicle 102 for upload to the mobile device 152. For instance, there may be new vocabulary 176 residing on the computing platform 104 (e.g., in storage 112) that is not also on the mobile device 152 (e.g., in storage 168). This new vocabulary 176 may include, in an example, vocabulary 176 terms relating to a new or updated software module or application installed to the computing platform 104 that identifies recommended vocabulary 176. This vocabulary 176 can be useful when vocabulary 176 specific training is performed by the user interacting with the voice learning application 170 to update his or her voice profile 174. If new vocabulary 176 is available for upload, control passes to operation 314, in which the vehicle 102 uploads the new vocabulary 176 information to the mobile device 152. After operation 314, or after operation 312 if no vocabulary 176 is to be updated, the process 300 ends.

Figure 4:
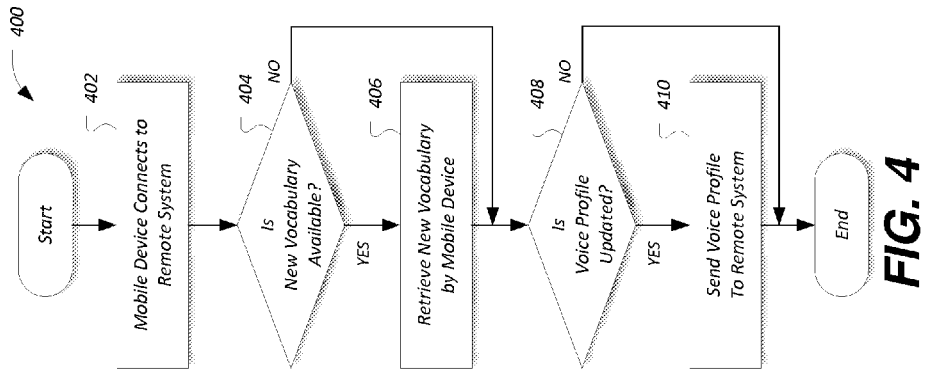
FIG. 4 illustrates an example process for connecting and synchronizing the mobile device with the remote telematics server.

FIG. 4 illustrates an example process 400 for connecting and synchronizing the mobile device 152 with the remote telematics server 162. The process 400 may be performed, in an example, by the mobile device 152 executing the voice learning application 170.

At operation 402, the mobile device 152 connects to a source of voice vocabulary 176 data. In an example, the mobile device 152 may connect to the remote telematics server 162 over the communications network 156. For instance, an update to the software configuration of the vehicle 102 may result in an update to a vehicle configuration file on the remote telematics server 162 that tracks the state of the vehicle's software state. The mobile device 152 may accordingly utilize the remote telematics server 162 to connect, even when not within connection range of the vehicle 102.

At operation 404, the mobile device 152 determines whether new application vocabulary 176 is available. For example, the mobile device 152 may identify (or may receive identification from the connected remote telematics server 162 or vehicle 102) whether any update to the configuration file or vehicle 102 may include indicate additional vocabulary 176 that may require training. If new vocabulary 176 is available, control passes to operation 406 to retrieve the new vocabulary 176. After operation 406, or after operation 404 if no vocabulary 176 is to be updated, control passes to operation 408.

At operation 408, the mobile device 152 determines whether the voice profile 174 should be provided to update the remote telematics server 162. For example, the mobile device 152 may request a last modified voice profile 174 timestamp from the remote telematics server 162, and if the mobile device 152 is storing a more updated voice profile 174 may determine to update the remote telematics server 162. In other cases, the mobile device 152 may always update the remote telematics server 162, or may periodically update the remote telematics server 162 (e.g., daily, weekly, etc.). If the mobile device 152 determines to update the voice profile 174, control passes to operation 410 to send the voice profile 174 to the remote telematics server 162. After operation 410, or after operation 408 if no voice profile 174 is to be updated, the process 400 ends.

Figure 5:
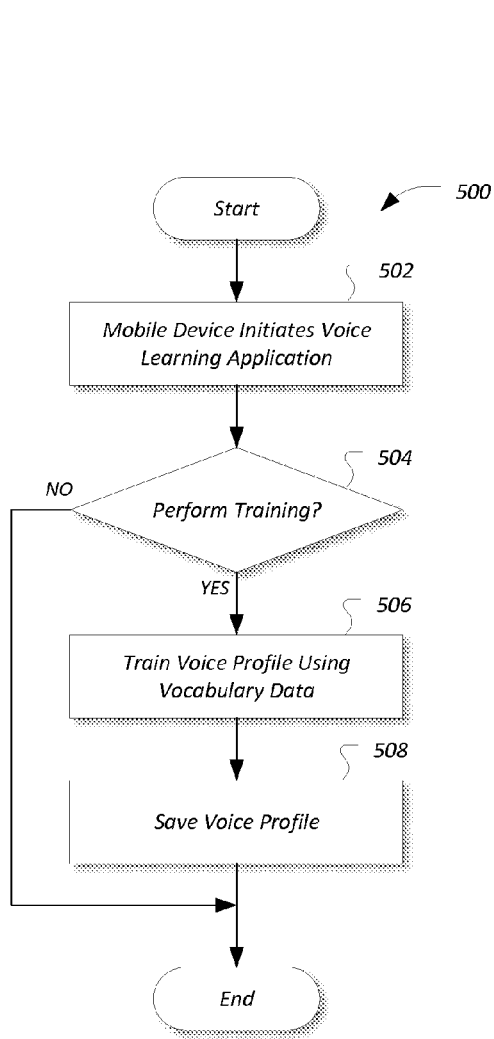
FIG. 5 illustrates an example process for using the mobile device of the user to perform voice training.

FIG. 5 illustrates an example process 500 for using the mobile device 152 of the user to perform voice training. The process 500 may be performed, in an example, by the mobile device 152 executing the voice learning application 170.

At operation 502, the mobile device 152 initiates the voice learning application 170. For example, the user may select the voice learning application 170 from a display or other HMI of the mobile device 152.

At operation 504, the mobile device 152 determines whether voice training should be performed. In an example, the user may select to perform training of vocabulary 176, or the training may be specified for the user based on vocabulary 176 on the mobile device 152 that had not yet been used by the user for training. In another example, training may be specified for the user using vocabulary 176 for recently used vehicle features (e.g., phone services, navigation services, etc.), or for vocabulary 176 for vehicle 102 features having at least a threshold amount of recognition errors by the voice interface 134 (e.g., such errors being identified by the vehicle 102 and indications of such errors being transferred to the mobile device 152). In yet another example, the mobile device 152 may select to train required, basic, or general vocabulary 176, and may then permit other training once the basic training is performed.

At operation 506, the mobile device 152 trains the voice profile 174 of the user using the vocabulary 176. For example, the mobile device 152 may specify for the user to say certain words or phrases as indicated by the vocabulary 176, and the mobile device 152 may receive the user responses and update the voice profile 174 accordingly.

At operation 508, the mobile device 152 stores the voice profile 174. In an example, the mobile device 152 may store the voice profile 174 to the storage 168 of the mobile device 152. Additionally or alternately, the mobile device 152 may send the voice profile 174 to the remote telematics server 162 for storage. After operation 508, the process 500 ends.

Figure 6:
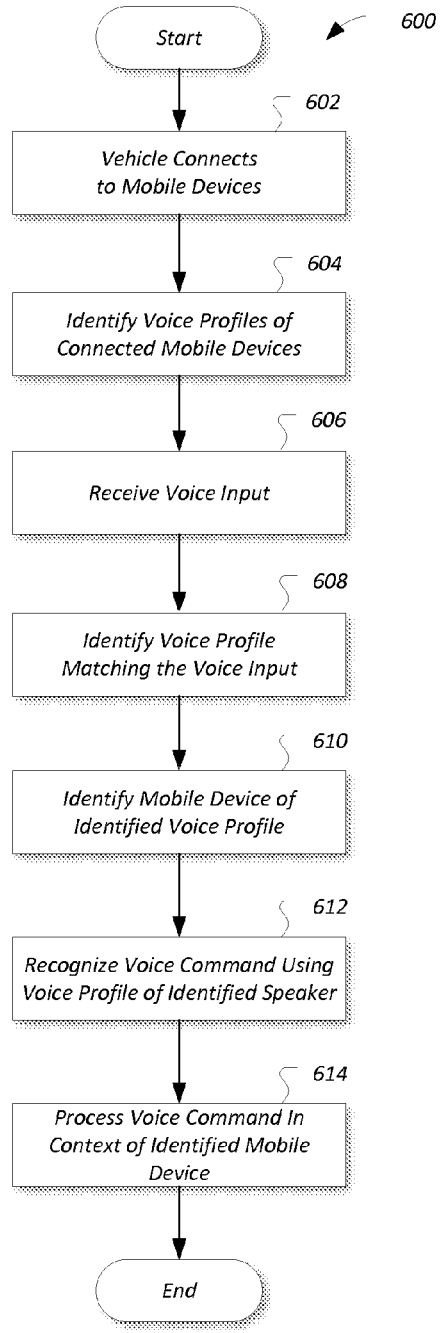
FIG. 6 illustrates an example process for using voice profiles for executing a voice command in the context of an identified mobile device.

FIG. 6 illustrates an example process 600 for using voice profiles 174 for executing a voice command 204, included within a voice input 202, in the context of an identified mobile device 152. The process 600 may be performed, in an example, by the vehicle 102 in communication with mobile devices 152 detected as being present within vehicle 102.

At operation 602, the vehicle 102 connects to the mobile devices 152 within the vehicle 102. In an example, the computing platform 104 may automatically connect to mobile devices 152 referenced in the paired device data 160, without user intervention.

At operation 604, the vehicle 102 identifies voice profiles 174 of the connected mobile devices 152. When the mobile device 152 is connected to the vehicle 102, the voice profile 174 information may be shared with the voice interface 134 of the computing platform 104 via the device link interface 172. As one possibility, the voice profile 174 may be transferred from the mobile device 152 to the computing platform 104. As another possibility, an identifier of the user may be transferred from the mobile device 152 to the computing platform 104, and the voice profile 174 may be retrieved by the vehicle 102 from the remote telematics server 162. As yet a further possibility, one or more voice profiles 174 of the connected mobile devices 152 may have been previously cached by the computing platform 104, and may be identified as available for use based on presence of the mobile device 152 by querying for voice profiles 174 in storage 112 of the computing platform 104 by mobile device 152 identifier.

At operation 606, the vehicle 102 receives voice input 202. In an example, a user of a mobile device 152 may speak the voice input 202, and the voice interface 134 of the computing platform 104 may receive an electrical signal of the spoken audio received via the microphone 116.

At operation 608, the vehicle 102 identifies the speaker of the voice input 202. In an example, the voice interface 134 may identify voice characteristics of the voice input 202, such as pitch, harmonics, average frequency of first formants, or other measureable vocal biometrics. Using the information of the voice profiles 174, the voice interface 134 may match those characteristics to the voice characteristics of each of the voice profiles 174 associated with mobile devices 152 connected to the computing platform 104. Based on the matching, the voice interface 134 may identify which voice profile 174 most closely matches the voice characteristics of the voice input 202.

At operation 610, the vehicle 102 identifies the mobile device 152 of the identified speaker. For example, the mobile device 152 may be identified as the device associated with the same unique identifier as the matching voice profile 174. Having identified the voice profile 174, the voice interface 134 may accordingly identify the mobile device 152 to use as a context for executing voice commands 204 within the voice input 202.

At operation 612, the vehicle 102 performs voice recognition on the voice input 202 using the identified voice profile 174. In an example, the voice interface 134 may identify a voice command 204 included in the voice input 202 using voice recognition techniques turned according to the voice characteristics and other information of the identified voice profile 174.

At operation 614, the vehicle 102 processes the voice command 204 in the context of the identified mobile device 152. For example, the voice interface 134 may process the voice command 204 in the context of the address book or other data or settings of the identified mobile device 152. After operation 614, the process 600 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a computing platform, including a processor, a voice interface configured to perform speech recognition from voice input received via a microphone, and a transceiver configured to communicate with a plurality of mobile devices connected to the computing platform, each of the mobile devices associated with a respective voice profile, the computing platform programmed to
identify which one of the voice profiles of the connected plurality of mobile devices most closely matches the voice input received from a user;
perform the speech recognition on the voice input using the voice profile matching the voice input to determine a voice command; and
process the voice command in context of the one of the mobile devices associated with the one of the voice profiles,
wherein the context of the one of the mobile devices includes an address book of the one of the mobile devices, the voice command includes a reference to an entry of the address book of the one of the mobile devices, the entry of the address book of the one of the mobile devices includes a contact name and a first contact phone number, another of the plurality of mobile devices connected to the computing platform includes an address book having an entry with the contact name and a second contact phone number different from the first contact phone number, and processing the voice command in the context of the one of the mobile devices includes using the first contact phone number.

2. The vehicle of claim 1, wherein the voice profile includes (i) speech recognition tuning information regarding a user, and (ii) vocal biometrics indicative of characteristics of the voice of the user.

3. The vehicle of claim 1, wherein the voice profile includes a unique identifier of the one of the mobile devices associated with the voice profile.

4. The vehicle of claim 1, wherein the computing platform is further configured to:
match vocal biometrics of the voice input to voice characteristics of each of the voice profiles associated with the plurality of mobile devices connected to the computing platform; and
identify which voice profile most closely matches the vocal biometrics of the voice input.

5. The vehicle of claim 4, wherein the computing platform is further configured to at least one of:
retrieve at least a subset of the voice profiles from a remote telematics server based on unique device identifiers retrieved from the plurality of mobile devices connected to the computing platform; and
retrieve at least a subset of the voice profiles from storage of the plurality of mobile devices connected to the computing platform.

6. The vehicle of claim 1, wherein the computing platform is further configured to automatically connect to mobile devices referenced in paired device data maintained by the computing platform.

7. A method comprising:
using a voice profile, identified by a computing platform of a vehicle as associated with an identified device of a plurality of mobile devices within the vehicle, for performing speech recognition on received voice input to determine a contact to call; and
calling the contact using a phone number stored to the identified device, each of the mobile devices having an address book including a different phone number for calling the contact.

8. The method of claim 7, wherein the voice profile includes (i) speech recognition tuning information regarding a user, and (ii) vocal biometrics indicative of characteristics of the voice of the user.

9. The method of claim 7, wherein the voice profile includes a unique identifier of the mobile device associated with the voice profile.

10. The method of claim 7, further comprising:
matching vocal biometrics of the voice input to voice characteristics of each of the voice profiles associated with mobile devices connected to the computing platform; and
identifying which voice profile most closely matches the vocal biometrics of the voice input.

11. The method of claim 7, further comprising automatically connecting to mobile devices referenced in paired device data maintained by the computing platform.

12. A non-transitory computer-readable medium, embodying instructions that, when executed by a processor of a vehicle, are configured to cause the processor to:
match vocal biometrics of voice input to voice characteristics of each of a plurality of voice profiles associated with mobile devices connected to the vehicle;
identify which voice profile most closely matches the vocal biometrics of the voice input;
perform speech recognition on the voice input using the identified voice profile to determine a voice command; and
process the voice command in context of the mobile device associated with the identified voice profile,
wherein the context of the mobile device includes an address book of the mobile device, and the voice command includes a reference to an entry of the address book of the mobile device, the entry of the address book of the mobile device associated with the identified profile includes a contact name and a first contact phone number, another of the mobile devices connected to the vehicle includes an address book having an entry with the contact name and a second contact phone number different from the first contact phone number, and processing the voice command in the context of the mobile device associated with the identified voice profile includes using the first contact phone number.

13. The medium of claim 12, further embodying instructions configured to cause the processor to retrieve at least a subset of the plurality of voice profiles from a remote telematics server based on unique device identifiers retrieved from the mobile devices connected to the vehicle.

14. The medium of claim 12, further embodying instructions configured to cause the processor to retrieve at least a subset of the plurality of voice profiles from storage of the mobile devices connected to the vehicle.

15. The medium of claim 12, wherein the voice profile includes (i) speech recognition tuning information regarding a user, and (ii) vocal biometrics indicative of characteristics of the voice of the user.

16. The medium of claim 12, wherein the voice profile includes a unique identifier of the mobile device associated with the voice profile.

17. The medium of claim 12, further embodying instructions configured to cause the processor to automatically connect to mobile devices referenced in paired device data maintained by the processor of the vehicle.

* * * * *